July 29, 1952

L. BOSA 2,604,858

DOUGHNUT FORMING GUN

Filed May 26, 1948

INVENTOR.
LOUIS BOSA
BY Joseph B. Gardner
atty

Patented July 29, 1952

2,604,858

UNITED STATES PATENT OFFICE 2,604,858

DOUGHNUT FORMING GUN

Louis Bosa, Orinda, Calif., assignor to Hom-Ade Inc., Oakland, Calif., a corporation of California Application May 26, 1948, Serial No. 29,247

4 Claims. (Cl. 107—14)

This invention relates to a machine for forming doughnuts and has particular reference to a hand-operated device that is suitable and adaptable for home use or limited commercial production.

An object of the invention is to provide a simple and inexpensive doughnut forming machine for delivering a formed doughnut to a cooking vessel.

Another object of the invention is to provide a device of the character described to form and deliver doughnuts of uniformly perfect shape and size.

A further object of the invention is to provide a doughnut forming gun in which there is incorporated means for unfailingly and automatically measuring the quantity of dough to be delivered at each operation of the gun.

Still another object of the invention is to provide a machine of the type referred to in which all the parts thereof may be easily and readily dismantled for cleaning.

Yet another object of the invention is to provide a doughnut gun which may be held and operated in one hand.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing.

Figures 1, 2:
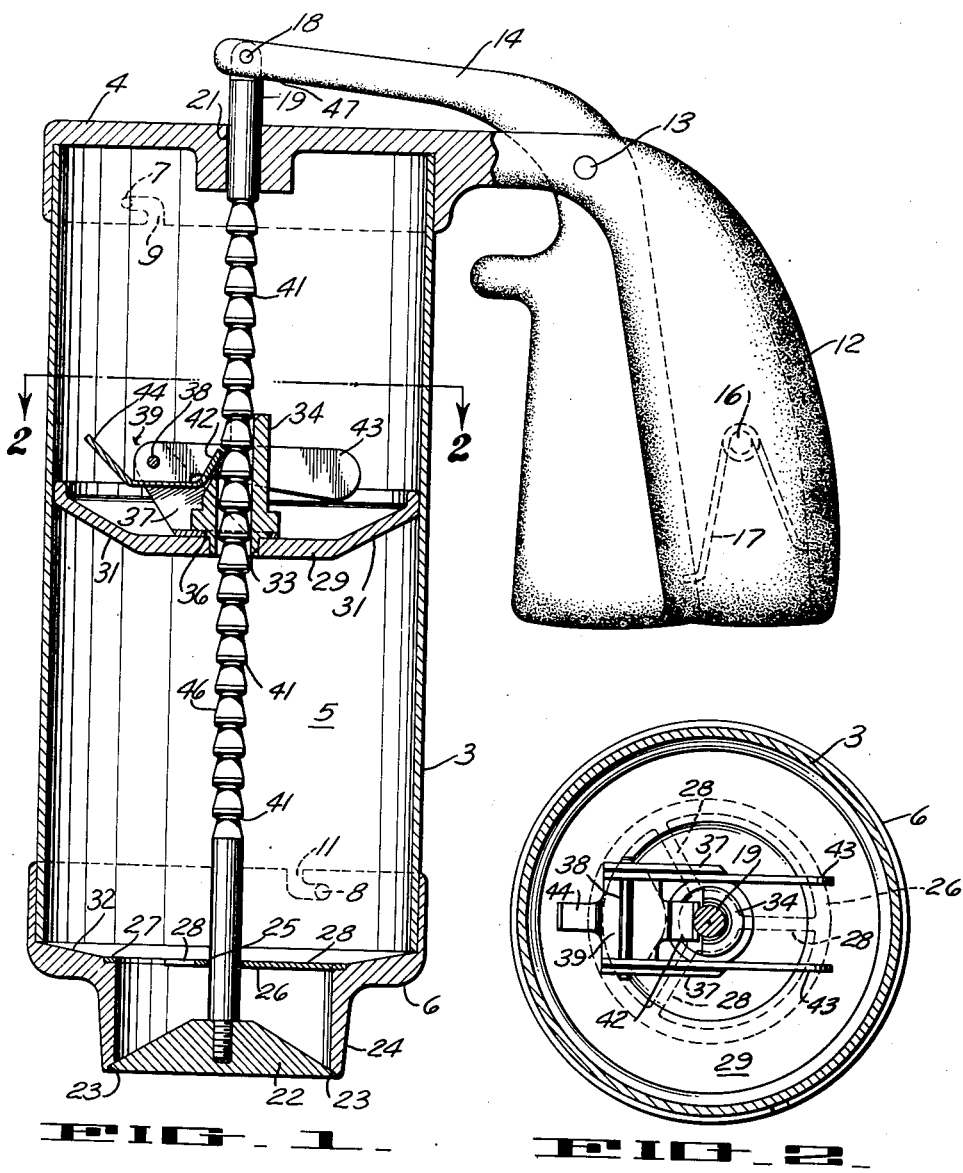
Figure 1 is a side elevational view of the gun embodying my invention shown mainly in vertical section along substantially the longitudinal axis of the device.
Figure 2 is a horizontal cross-sectional view taken on the line 2—2 of Figure 1.

In carrying out my invention, I provide a preferably cylindrical open-ended container 3, provided at the top end thereof with a suitable cover 4 and at the bottom end with a cap 6. Both the cover 4 and cap 6 are detachable, and are preferably secured to the container by projecting studs 7 and 8 on the container which may be engaged and seated in L-shaped slots 9 and 11 of the cover and cap respectively.

Extending from and preferably integral with the cover 4 is a handle 12 perforated to receive a pin 13 on which a lever 14 is pivotally mounted. For ease of operation, the outer ends of the handle 12 and lever 14 are shaped so as to form a pistol grip, and inserted therebetween, by means of a suitable attachment pin 16 mounted on the handle, is a spring 17 whose function will be hereinafter more fully described. The lever 14 is perforated at one end thereof to receive a pin 18 on which the top end of a plunger rod 19 is pivotally connected. The cover is provided with a central aperture 21 to receive and guide the plunger rod which is here shown threaded at its bottom end to engage a cutter 22. Although the plunger rod is shown as being threadedly engaged with the cutter, it is apparent that any other suitable detachable connection means could be used. The cutter 22 is preferably of a frusto-conical shape and adapted to be seated in a complementary groove 23 of a substantially cylindrical skirt 24 of the cap 6 so as to seal the interior 5 of the container when the cutter is in closed or seated position in the groove 23. When the rod 19 is depressed, the cutter 22 is projected downward from the groove 23 leaving an annular open space through which portions of the contents in the container may be extruded.

A spider like frame 26 is provided with a plurality of arms 28 connected by a rim adapted to engage a groove 27 in the cap 6. Although three arms are shown on the drawing, two or four arms would serve the purpose equally well. The frame is provided with a central aperture 25 to receive and guide the plunger rod so as to insure proper axial alignment of the cutter during the downward and upward movement of the plunger and cutter. The spider frame is located at a suitable distance from the discharge aperture in order to allow the dough in the container sufficient time to flow together after being cut by the arms 28.

Slidable longitudinally within the container is a piston 29 having a lower surface 31. The purpose of this feature will be evident when the operation of the device is more fully described. The piston is provided with a central aperture 33 into which a guide sleeve 34 is pressed or otherwise suitably secured, and through which the plunger rod is freely slidable. Secured in a groove 36 of the guide sleeve and angularly rising therefrom is a member including a pair of substantially parallel ears or lugs 37 perforated near the ends thereof to receive a pin 38 on which a ratchet mechanism 39 is pivotally mounted.

It will be noted that the plunger rod is provided with a plurality of equally spaced peripheral grooves 41 adapted to be engaged by the pawl 42 of a ratchet mechanism. Preferably, the grooves or indentations on the rod are of substantial triangular form, the base of which includes a trans-axial indentation and the side of which includes an upwardly and inwardly directed generally axial cut out portion of the rod. All sharp corners have been eliminated from the grooves in the rod to facilitate cleaning. The ratchet mechanism is also provided with a pair of counterweights 43 which extend a sufficient distance from the opposite side of the plunger rod so as to urge the pawl into intimate engagement with the plunger rod. Extending in the other direction from the pawl on the ratchet mechanism is a stop 44 which limits the rotation of the ratchet mechanism about the pin 38 when the container is inverted.

The entire ratchet mechanism operates on a gravity feed principle and is not dependent on any springs or other complex mechanisms heretofore used to accomplish its desired result or to insure repeated functioning thereof.

To operate the gun, it is first necessary to supply a quantity of doughnut batter to the container. This may be done by removing the cutter 22 and the bottom cap 6, inverting the container, and pouring the batter therein. When the container is inverted, the counterweights will cause the pawl to disengage the groove on the rod, thereby causing the piston to slide to its uppermost position in the container. After the container is filled with batter, the bottom cap and the cutter replaced, the gun is in operative condition to form a doughnut.

The gun is held by the pistol grip heretofore mentioned, and the operator by squeezing the lever 14 towards and against the handle 12, will cause a downward movement of the plunger rod and cutter. As the pawl on the ratchet mechanism is engaged with a groove on the plunger rod, the ratchet mechanism and piston will similarly move downward with the rod. The downward movement of the piston against the batter in the container will force an annular ring of dough out and through the annular space created by the movement of the cutter downward from the skirt 24. It is apparent that the quantity of dough thus extruded will be uniformly equal and will depend solely on the amount of downward travel of the plunger rod. It will be observed that this downward travel of the plunger rod is limited in amount to the vertical distance existing between the top of the cover 4 and the bottom surface of the lever 47. This distance is substantially equal to the spacing between adjacent grooves on the rod, and is designed to permit a desirable and properly sized ring of dough to be extruded in each operation of the gun.

When the operator releases his grip on the lever 14, the spring 17 will forcibly urge the lever away from the handle and cause the plunger rod to return upwardly to its starting position. This upward movement of the rod causes the cutter to seat, thereby severing the extruded ring of dough from the container; the ring being then free to fall into a suitable cooking vessel. During the return movement of the rod, the pawl will slide on the sloping surface 46 of the grooves and the ratchet mechanism will pivot about the pin 38. When the rod has returned to its starting position, the counterweights will cause the ratchet mechanism to pivot in a direction opposite to that just described, positioning the pawl for engagement with the groove below the one engaged at the start of the operation.

Thus, with each downward movement of the rod, the piston is forced downwardly an amount equal to the distance between adjacent grooves; and the machine will continue to extrude doughnut rings as fast as the operator consecutively squeezes and releases the pistol grip, until the lower surface of the piston reaches the upper surface 32 of the bottom closure at which time, substantially all the batter has been expended. The container may then be refilled and the operation hereinabove described may be repeated.

I claim:

1. In a dispenser provided with a chamber for containing flowable material and having a discharge aperture for said material controllable by a valve cooperative with and to open and close said aperture, a control rod extending through the upper end of said dispenser and connected with and to operate said valve, means adjacent said upper end for effecting axial movement of said rod, said rod having spaced indentations therealong, a piston surrounding the control rod and disposed on top of the material in said chamber, guide means carried by the piston and slidably engaged with said rod, a pawl member pivotally mounted on said piston and movable into and out of engagement with said indentations of the rod, and gravity operated means traversing said rod and connected with said pawl for urging the latter into engagement with said indentations, and operable in normal positions of said dispenser to continuously maintain the pawl in engagement with said rod and operable in inverted positions of said dispenser to disengage the pawl from said rod.

2. In a dispenser provided with a chamber for containing flowable material and having a discharge aperture for said material controllable by a valve cooperative with and to open and close said aperture, a control rod extending through and connected with and to operate said valve, means for effecting axial movement of said rod, said rod having spaced peripheral indentations therealong, a piston surrounding the control rod and disposed on top of the material in said chamber, a pawl member rockably mounted on said piston and movable into and out of engagement with said indentations of the rod, a sleeve slidable on said control rod having in a portion thereof a cutout for admission of said pawl to engage said indentations, said sleeve having a shoulder thereon and being in secure frictional engagement with said piston, means associated with said pawl member for limiting the degree of disengagement thereof with said indentations, and gravity operated means connected with said pawl for urging the latter into engagement with said indentations when the dispenser is in its normal position and for disengaging said pawl from said indentations upon inverting said dispenser, said latter means being disposed beyond the side of the rod remote from said engaged indentations.

3. In a dispenser provided with a chamber for containing flowable material and having a discharge aperture for said material controllable by a valve cooperative with and to open and close said aperture, a control rod extending through and connected with and to operate said valve, means for effecting axial movement of said rod, said rod having spaced peripheral indentations therealong, a piston surrounding the control rod and disposed on top of the material in said chamber, a sleeve slidable on said control rod having in a portion thereof a cutout and a shoulder thereon for secure frictional engagement with said piston, a bracket secured between said sleeve and piston, a pawl member pivotally mounted on said bracket and movable through said cutout into and out of engagement with said indentations of the rod, means associated with said pawl member and engageable with said piston for limiting the degree of disengagement thereof with said indentations, and a counterbalance connected with said pawl and extending beyond the side of said rod remote from said engaged indentations for urging the pawl into engagement with said indentations, and operable in normal and inverted positions of said dispenser to respectively engage and disengage the pawl with and from said indentations.

4. In a dispenser provided with a chamber for containing flowable material and having a discharge aperture for said material controllable by a valve cooperative with and to open and close said aperture, a control rod extending through and connected with and to operate said valve, means for effecting axial movement of said rod, said rod having spaced peripheral indentations therealong generally of substantial triangular form in which the trans-axial and generally axially extending faces are devoid of marked points of intersection, a piston surrounding the control rod and disposed on top of the material in said chamber, a sleeve slidable on said control rod having in a portion thereof a cutout and a shoulder thereon for secure frictional engagement with said piston, a bracket secured between said sleeve and piston, a ratchet member pivotally mounted on said bracket including a pawl movable through said cutout into and out of engagement with said indentations of the rod, arresting means associated with said ratchet member for limiting the degree of disengagement of said pawl with said indentations, and a counterbalance connected with said pawl for urging the latter into engagement with said indentations, and operable in normal and inverted positions of said dispenser to respectively engage and disengage the pawl with and from said indentations.

LOUIS BOSA.

REFERENCES CITED

The following references are of record in the file of this patent:

UNITED STATES PATENTS

| Number | Name | Date |
|---|---|---|
| 367,698 | Burgess | Aug. 2, 1887 |
| 677,667 | Kirschen | July 2, 1901 |
| 1,847,188 | Kreidel | Mar. 1, 1932 |
| 2,151,684 | Casella | Mar. 28, 1939 |
| 2,416,470 | Cottingham | Feb. 25, 1947 |